United States Patent
Chilla et al.

(10) Patent No.: US 8,837,405 B2
(45) Date of Patent: Sep. 16, 2014

(54) METHODS AND APPARATUS TO REDUCE A TIME TO TRANSFER MULTIPLE PDN CONTEXTS DURING INTER-RADIO ACCESS TECHNOLOGY HANDOFF

(75) Inventors: Rajashekar Chilla, San Diego, CA (US); Shrawan K. Khatri, San Dieigo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 13/398,627

(22) Filed: Feb. 16, 2012

(65) Prior Publication Data
US 2012/0218971 A1    Aug. 30, 2012

Related U.S. Application Data

(60) Provisional application No. 61/446,445, filed on Feb. 24, 2011.

(51) Int. Cl.
*H04Q 7/00* (2006.01)
*H04W 36/00* (2009.01)
*H04W 76/04* (2009.01)

(52) U.S. Cl.
CPC .......... *H04W 36/0066* (2013.01); *H04W 76/04* (2013.01)
USPC .......................................... 370/329; 370/330

(58) Field of Classification Search
CPC .................. H04W 36/0066; H04W 76/04
USPC .................. 370/331, 329, 330, 328
See application file for complete search history.

(56) References Cited

U.S. PATENT DOCUMENTS

| | | | |
|---|---|---|---|
| 7,969,931 B2 | 6/2011 | Bachmann et al. | |
| 8,072,923 B2 | 12/2011 | Chen et al. | |
| 8,374,604 B2* | 2/2013 | Cherian et al. | 455/435.2 |
| 8,432,872 B2* | 4/2013 | Swaminathan | 370/332 |
| 8,477,724 B2* | 7/2013 | Bakker et al. | 370/331 |
| 8,630,645 B2* | 1/2014 | Chowdhury et al. | 455/436 |
| 2008/0304450 A1 | 12/2008 | Rexhepi et al. | |
| 2009/0129342 A1* | 5/2009 | Hwang et al. | 370/331 |
| 2009/0290540 A1* | 11/2009 | Cherian et al. | 370/328 |
| 2009/0316656 A1* | 12/2009 | Zhao et al. | 370/331 |

(Continued)

FOREIGN PATENT DOCUMENTS

WO    WO2009118661 A2    10/2009

OTHER PUBLICATIONS

U.S. Appl. No. 61/428,844, filed Dec. 30, 2010.*

(Continued)

*Primary Examiner* — Chuong T Ho
(74) *Attorney, Agent, or Firm* — Patterson & Sheridan, L.L.P.

(57) ABSTRACT

Aspects of the present disclosure provide apparatus and methods to reduce the time taken to perform multiple packet data network (PDN) context transfers during inter-radio access technology (IRAT) scenarios. Certain aspects provide methods and apparatus for wireless communication by a device capable of communicating in at least a first and second RAT networks. The device may have multiple PDN contexts established in the first RAT network. As part of a transition to the second RAT network, the mobile device may transmit a single signaling message that indicates at least two of the PDN contexts to be transferred. In some aspects, the single signaling message may also indicate a new PDN context to be established as part of the transition.

96 Claims, 10 Drawing Sheets

(56) References Cited

U.S. PATENT DOCUMENTS

| | | | |
|---|---|---|---|
| 2010/0323696 A1* | 12/2010 | Cherian et al. | 455/435.2 |
| 2011/0039562 A1 | 2/2011 | Balasubramanian et al. | |
| 2011/0065435 A1* | 3/2011 | Pancorbo Marcos et al. | 455/436 |
| 2011/0171953 A1* | 7/2011 | Faccin et al. | 455/426.1 |
| 2012/0051328 A1* | 3/2012 | Swaminathan | 370/332 |
| 2012/0063419 A1* | 3/2012 | Zhao et al. | 370/331 |
| 2012/0076121 A1* | 3/2012 | Choi et al. | 370/338 |
| 2012/0093129 A1* | 4/2012 | Zhao et al. | 370/331 |
| 2012/0172036 A1* | 7/2012 | Bhalla | 455/432.1 |
| 2012/0300750 A1* | 11/2012 | Chin et al. | 370/331 |
| 2013/0142172 A1* | 6/2013 | Parsons et al. | 370/331 |
| 2013/0308527 A1* | 11/2013 | Chin et al. | 370/328 |

OTHER PUBLICATIONS

Su, et al., "A New Context Awareness Scheme for Multi-mode Mobile Terminals in Mobile Internet," Wireless, Mobile and Multimedia Networks (ICWMNN 2010), IET 3rd International Conference, Sep. 26-29, 2010, pp. 95-98, 2010.

3GPP2: "E-UTRAN-eHRPD Connectivity and Interworking: Core Network Aspects", 3GPP2-DRAFTS, 2500 Wilson Boulevard, Suite 300, Arlington, Virginia 22201, USA, Dec. 31, 2008, XP040489684.

"3rd Generation Partnership Project; Technical Specification Group Core Network and Terminals; Access to the 3GPP Evolved Packet Core (EPC) via non-3GPP access networks; Stage 3 (Release 10)", 3GPP Standard; 3GPP TS 24.302, 3rd Generation Partnership Project (3GPP), Mobile Competence Centre; 650, Route Des Lucioles; F-06921 Sophia-Antipolis Cedex; France, No. V10.2.0, Dec. 19, 2010, pp. 1-56, XP050462300, [retrieved on Dec. 19, 2010].

"3rd Generation Partnership Project; Technical Specification Group Services and System Aspects; Architecture enhancements for non-3GPP accesses (Release 10)", 3GPP Standard; 3GPP TS 23.402, 3rd Generation Partnership Project (3GPP), Mobile Competence Centre; 650, Route Des Lucioles; F-06921 Sophia-Antipolis Cedex; France, No. V10.2.1, Jan. 4, 2011, pp. 1-228, XP050462518, [retrieved on Jan. 4, 2011].

International Search Report and Written Opinion—PCT/US2012/025694—ISA/EPO—Apr. 25, 2012.

* cited by examiner

US 8,837,405 B2

METHODS AND APPARATUS TO REDUCE A TIME TO TRANSFER MULTIPLE PDN CONTEXTS DURING INTER-RADIO ACCESS TECHNOLOGY HANDOFF

CROSS-REFERENCE TO RELATED APPLICATIONS

This application claims benefit of U.S. Provisional Patent Application Ser. No. 61/446,445, filed Feb. 24, 2011, which is expressly incorporated by reference herein in its entirety.

BACKGROUND

1. Field

Certain aspects of the present disclosure generally relate to wireless communications and, more particularly, to reducing a time taken to perform multiple packet data network (PDN) context transfers during an inter-radio access technology (IRAT) handoff.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The 3GPP LTE represents a major advance in cellular technology and it is a next step forward in cellular $3^{rd}$ generation (3G) services as a natural evolution of Global System for Mobile Communications (GSM) and Universal Mobile Telecommunications System (UMTS). The LTE provides for an uplink speed of up to 75 megabits per second (Mbps) and a downlink speed of up to 300 Mbps, and brings many technical benefits to cellular networks. The LTE is designed to meet carrier needs for high-speed data and media transport as well as high-capacity voice support. The bandwidth may be scalable from 1.25 MHz to 20 MHz. This suits the requirements of different network operators that have different bandwidth allocations, and also allows operators to provide different services based on spectrum. The LTE is also expected to improve spectral efficiency in 3G networks, allowing carriers to provide more data and voice services over a given bandwidth.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses OFDMA on the downlink and Single Carrier-Frequency Division Multiple Access (SC-FDMA) on the uplink. OFDMA allows data to be directed to or from multiple users on a subcarrier-by-subcarrier basis for a specified number of symbol periods.

SUMMARY

Certain aspects of the present disclosure provide a method for wireless communication by a device capable of communicating in at least first and second radio access technology (RAT) networks. The method generally includes communicating in the first RAT network with connectivity with a plurality of packet data network (PDN) contexts and as part of a transition to the second RAT network, and sending a single signaling message that indicates at least two of the plurality of PDN contexts.

Certain aspects of the present disclosure provide a method for wireless communication with a device capable of communicating in at least first and second radio access technology (RAT) networks. The method generally includes receiving, as part of a transition of the device from the first RAT network to the second RAT network, a single signaling message from the device that indicates multiple PDN contexts with which the device was communicating in the first RAT network, and processing the single signaling message to transfer the multiple PDN contexts from the first RAT network to the second RAT network.

Certain aspects of the present disclosure provide an apparatus for wireless communication capable of communicating in at least first and second radio access technology (RAT) networks. The apparatus generally includes means for communicating in the first RAT network with connectivity with a plurality of packet data network (PDN) contexts and means for sending a single signaling message that indicates at least two of the plurality of PDN contexts, as part of a transition to the second RAT network.

Certain aspects of the present disclosure provide an apparatus for wireless communication with a device capable of communicating in at least first and second radio access technology (RAT) networks. The apparatus generally includes means for receiving, as part of a transition of the device from the first RAT network to the second RAT network, a single signaling message from the device that indicates multiple PDN contexts with which the device was communicating in the first RAT network and means for processing the single signaling message to transfer the multiple PDN contexts from the first RAT network to the second RAT network.

In an aspect of the disclosure, an apparatus for wireless communications is provided. The apparatus generally includes at least one processor and a memory coupled to the at least one processor. The at least one processor is generally configured to communicate in the first RAT network with connectivity with a plurality of packet data network (PDN) contexts, and as part of a transition to the second RAT network, send a single signaling message that indicates at least two of the plurality of PDN contexts.

In an aspect of the disclosure, an apparatus for wireless communications is provided. The apparatus generally includes at least one processor and a memory coupled to the at least one processor. The at least one processor is generally configured to receive, as part of a transition of the device from the first RAT network to the second RAT network, a single signaling message from the device that indicates multiple PDN contexts with which the device was communicating in the first RAT network, and process the single signaling message to transfer the multiple PDN contexts from the first RAT network to the second RAT network.

Certain aspects of the present disclosure provide a computer-program product for wireless communications by a device capable of communicating in at least first and second radio access technology (RAT) networks. The computer-program product generally includes a non-transitory computer-readable medium having code stored thereon. The code is generally executable by one or more processors for communicating in a first RAT network with connectivity with a plurality of packet data network (PDN) contexts and, as part of a transition to the second RAT network, sending a single signaling message that indicates at least two of the plurality of PDN contexts.

Certain aspects of the present disclosure provide a computer-program product for wireless communications with a device capable of communicating in at least first and second radio access technology (RAT) networks. The computer-program product generally includes a non-transitory computer-readable medium having code stored thereon. The code is generally executable by one or more processors for receiving, as part of a transition of the device from the first RAT network to a second RAT network, a single signaling message from a device that indicates multiple PDN contexts with which the device was communicating in the first RAT network and processing the single signaling message to transfer the multiple PDN contexts from the first RAT network to the second RAT network.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
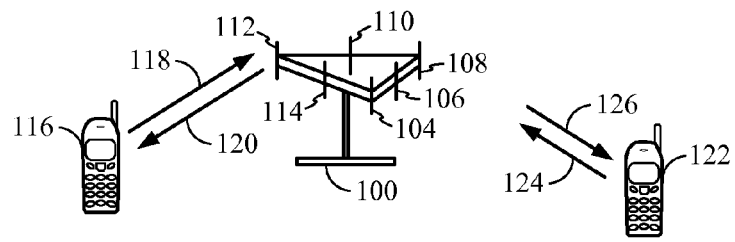
FIG. 1 illustrates an example multiple access wireless communication system, in accordance with aspects of the present disclosure.

Aspects of the present disclosure generally relate to minimizing the time taken to perform multiple PDN context transfers when a multi-mode mobile device moves from one RAT network to another RAT network. As will be described in more detail below, the mobile device may, as part of a transition from a first RAT network to a second RAT network, send a single signaling message that indicates multiple PDN contexts that may need to be transferred to the second RAT.

According to aspects, the second RAT network may receive, as part of a transition of the device to the second RAT network, a single signaling message from the mobile device that indicates multiple PDN contexts with which the device was communicating in the first RAT network. The second network may process the single signaling message to transfer the multiple contexts from the first RAT to the second RAT. As will be described in more detail below, the network may transfer multiple PDN contexts in parallel or one at a time. Employing a single signaling message rather than a separate signaling message for each context may reduce a call setup time.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

An access point ("AP") may comprise, be implemented as, or known as NodeB, Radio Network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect of the present disclosure is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
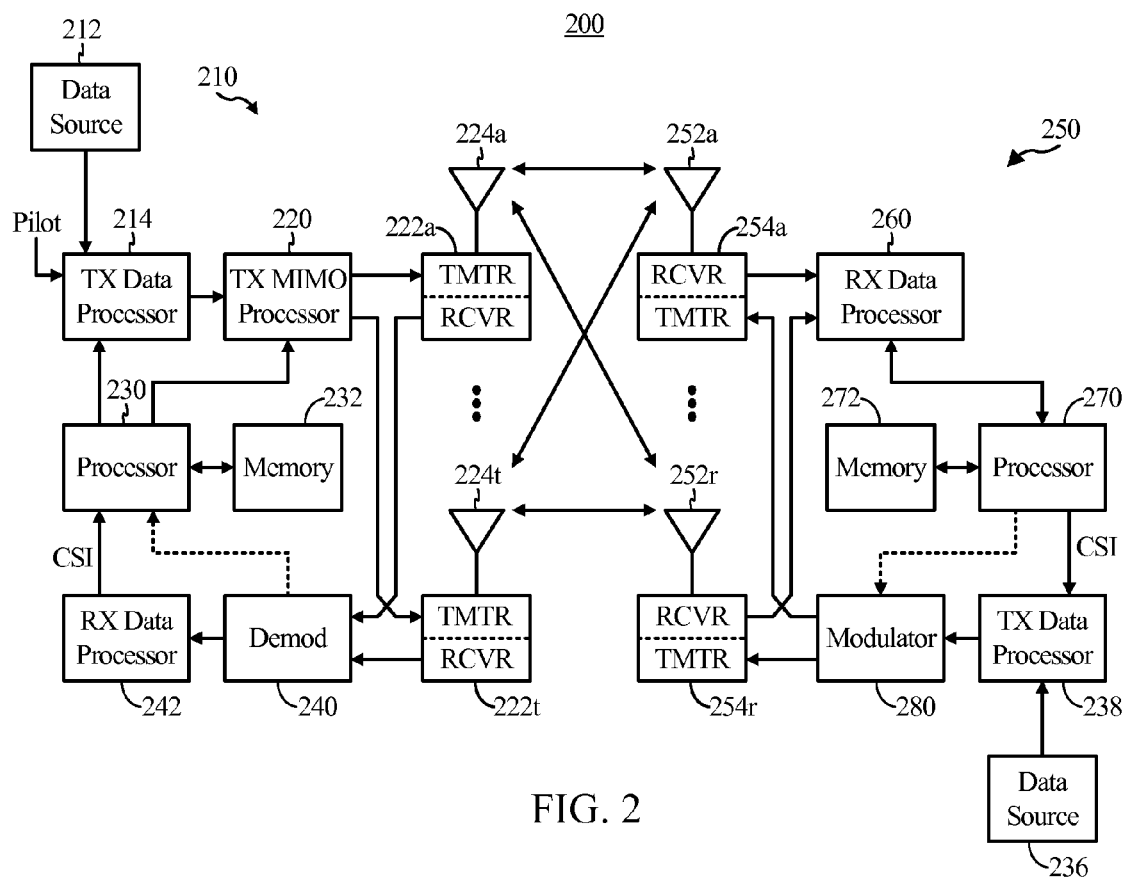
FIG. 2 illustrates a block diagram of an access point and a user terminal, in accordance with aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and down-converts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
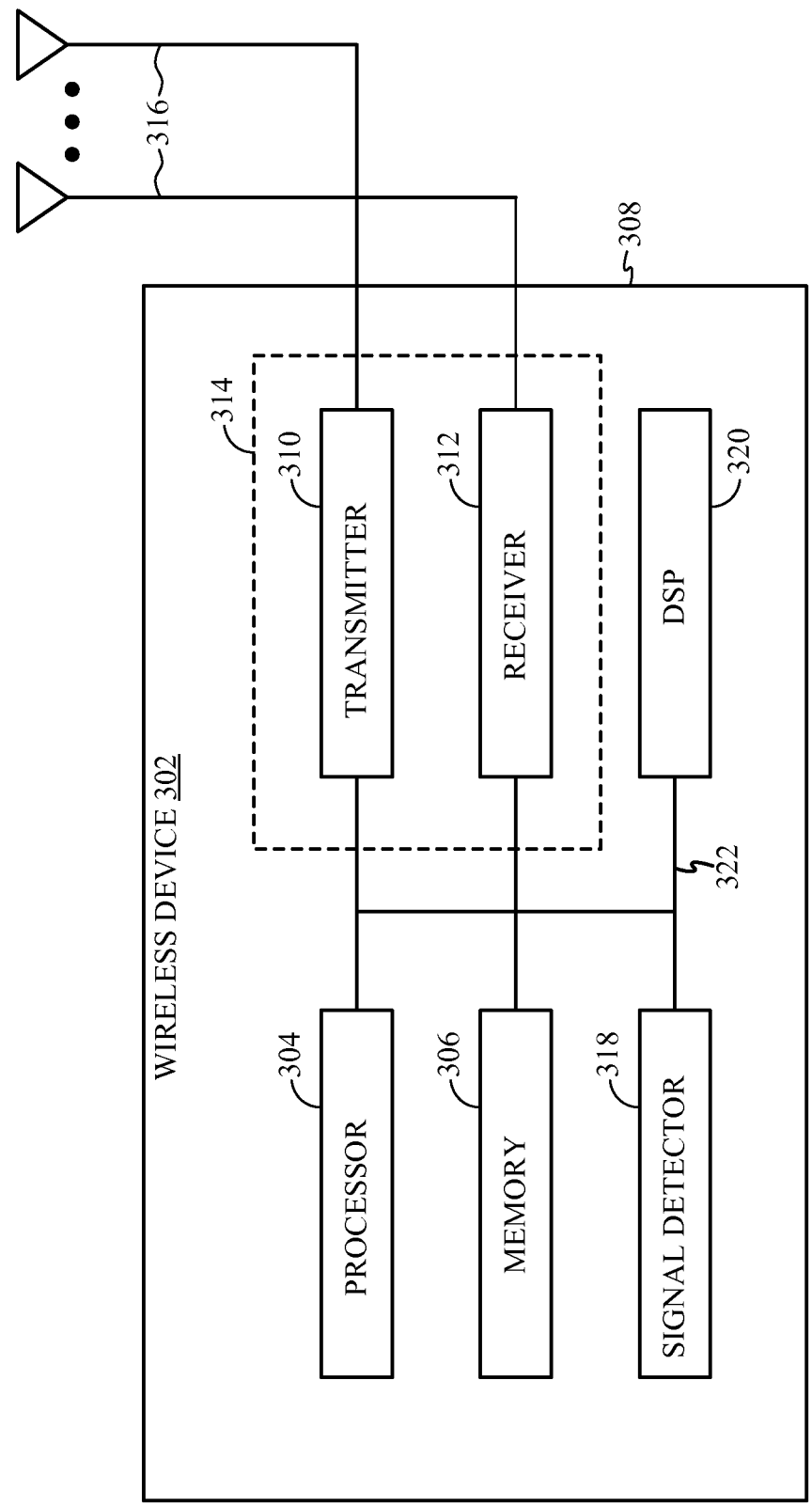
FIG. 3 illustrates a block diagram of an example wireless device, in accordance with aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
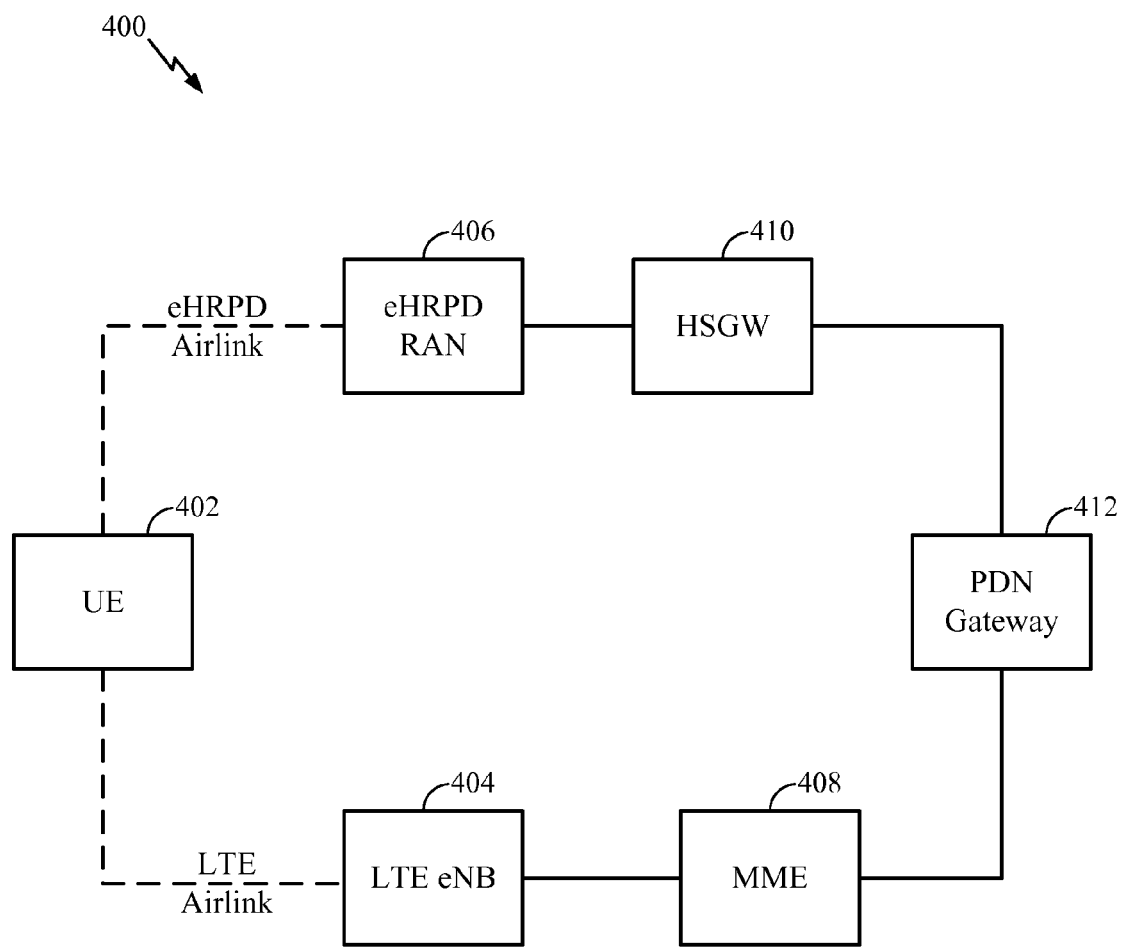
FIG. 4 illustrates an example network architecture, in accordance with aspects of the present disclosure.

FIG. 4 illustrates an example network architecture 400, according to aspects of the present disclosure. A multi-mode user-equipment 402, such as UE 116 and/or 122 of FIG. 1, may communicate with one or more RATs. UE 402 may communicate with, a Long Term Evolution (LTE) network and an enhanced High Rate Packet Data (eHRPD) network. UE 402 may communicate with, for example, LTE eNB 404 and eHRPD radio access network (RAN) 406.

LTE eNB 404 and eHRPD RAN 406 may use an EPC (3GPP) core network for Internet Protocol (IP) services. Mobility Management Entity (MME) 408 and HRPD serving gateway (HSGW) 410 may communicate with a Packet Data Network (PDN) Gateway 412. MME 408 for LTE and HSGW 410 for eHRPD may assign an IP address to UE 402 after receiving it from the PDN Gateway 412. MME 408, HSGW 410, and PDN Gateway 412 may be considered part of the Evolved Packet Core (EPC).

IRAT Improvement

A multi-mode mobile device may perform multiple Packet Data Network (PDN) context transfers during inter-RAT (IRAT) scenarios. Traditionally, single shot signaling techniques to transfer multiple PDN contexts are not available. For example, as will be described with reference to FIGS. 5-6, a mobile device capable of supporting LTE and Evolved High Rate Packet Data (eHRPD) technologies may perform multiple-PDN context transfers during an inter-RAT scenario, which may lead to delays in PDN context transfers and may degrade a user's experience.

Figure 5:
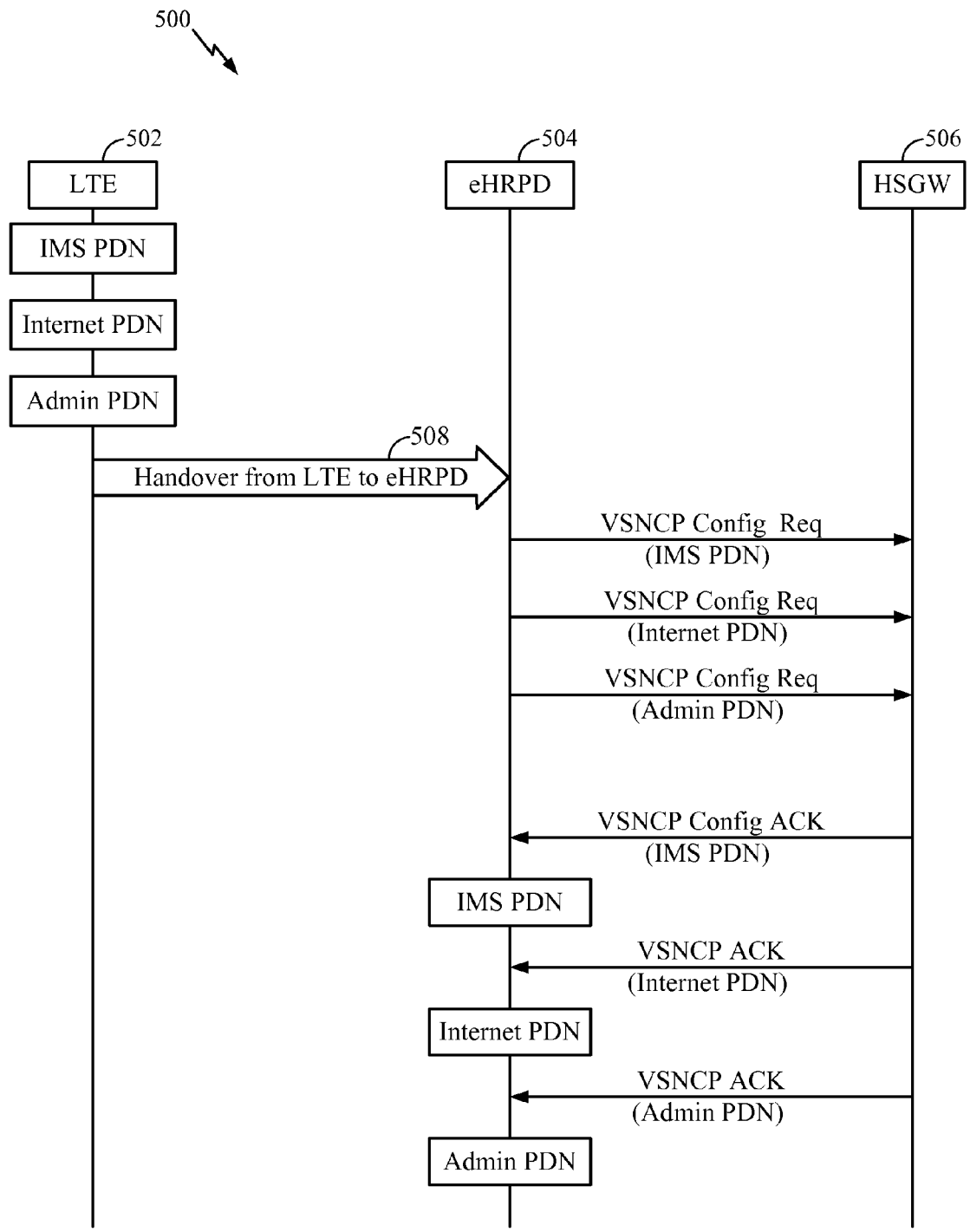
FIG. 5 illustrates an example of transferring multiple PDN contexts during handover from an LTE network to an eHRPD network.

FIG. 5 illustrates an example 500 of transferring multiple PDN contexts during handover from an LTE network 502 to an eHRPD network 504. As illustrated, a multi-mode mobile device may communicate in the LTE network 502 and have connectivity with a number of PDN contexts. The mobile device may be connected to, for example, an IP Multimedia Subsystem (IMS) PDN, Internet PDN, and/or Administrative PDN (e.g., Provisioning PDN).

At 508, the mobile device may handover from the LTE network 502 to the eHRPD network 504. Currently, the mobile device may have to exchange a Point-to-Point Protocol Vendor-Specific Network Control Protocol (PPP/VSNCP) signaling message to transfer each PDN context from LTE to eHRPD. More specifically, the mobile device may transmit a separate VSNCP configuration request message to an HRPD Serving Gateway (HSGW) 506 for each PDN context established in the LTE network 502. Transmitting multiple PPP/VSNCP signaling messages may lead to delays in PDN context transfers. HSGW 506 may transmit a configuration acknowledgment message for each PDN context before each PDN context is set up in the eHRPD network 504.

Figure 6:
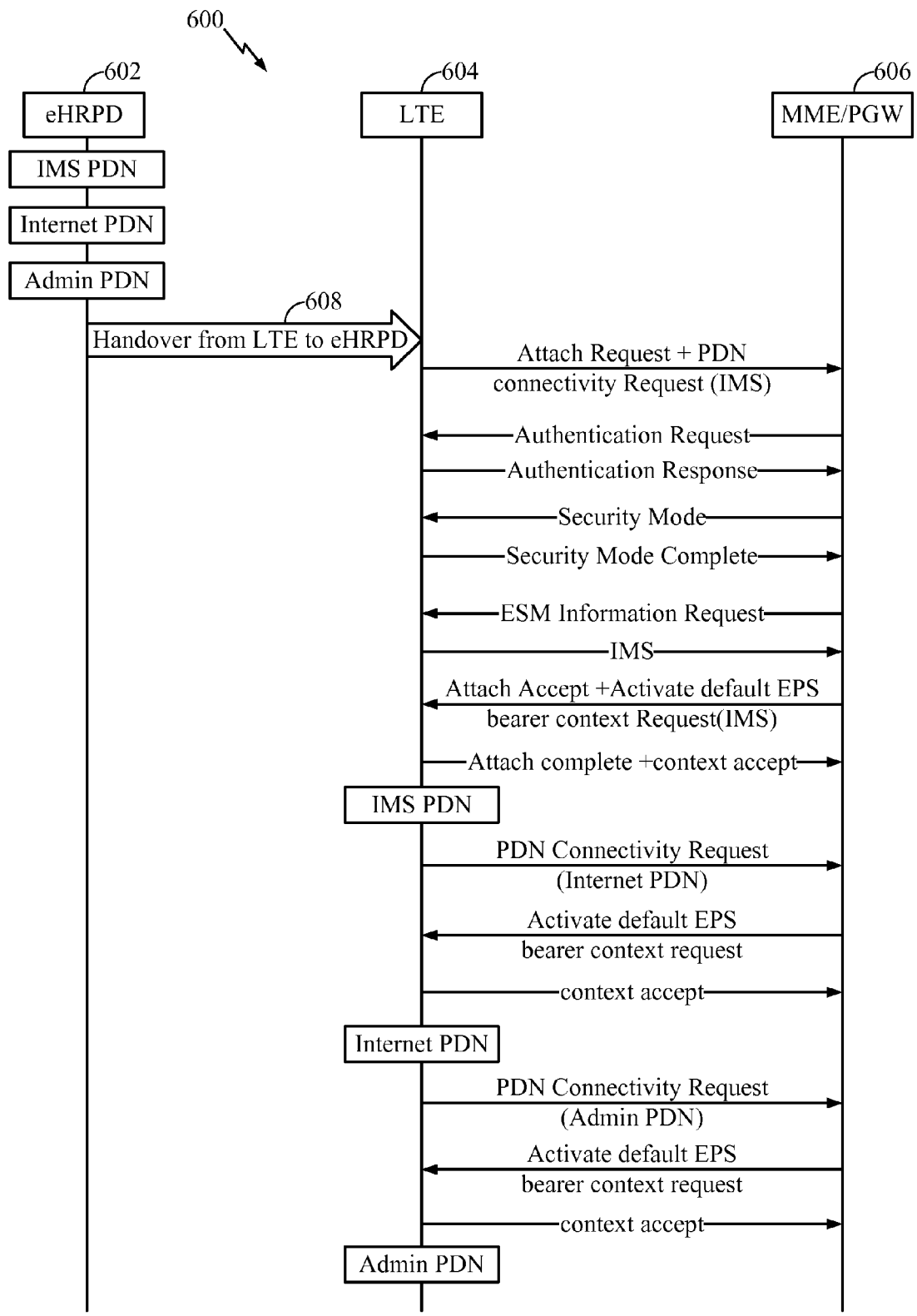
FIG. 6 illustrates an example of transferring multiple PDN contexts during handover from an eHRPD network to an LTE network.

FIG. 6 illustrates an example 600 of transferring multiple PDN contexts during handover from an eHRPD network 602 to an LTE network 604. As illustrated, a multi-mode mobile device may communicate in the eHRPD network 602 with connectivity with multiple PDN contexts. For example, the mobile device may be connected to an IMS PDN, Internet PDN, and/or Administrative PDN.

At 608, the mobile device may handover from the eHRPD network 602 to the LTE network 604. Similar to the scenario illustrated in FIG. 5, the mobile device may have to exchange multiple signaling messages to transfer the multiple PDN contexts.

While connected to the LTE network 604, the mobile device may transmit several Network Access Stratum (NAS) signaling messages to a Mobility Management Entity/PDN Gateway (MME/PGW) 606 to transfer PDN contexts from the eHRPD 602 network. The specific signaling messages depicted in FIG. 6 are illustrative of an example set of messages exchanged between a mobile device and the MME/PGW 606 to transfer multiple PDN contexts.

The mobile device may have to wait until the completion of the Attach Request before other PDN contexts may be transferred. This may degrade user experience, for example, in cases where other PDN contexts belong to an Internet Access Point Name (APN). If there are delays during the attach PDN setup completion due to, for example, LTE radio conditions, then the Internet APN and setup for other APNs may be delayed further or disconnected. The mobile device may have to make a priority call based on which application needs service first and, accordingly, which subsequent PDN is activated second, third, fourth, and so on.

Accordingly, aspects of the present disclosure provide techniques to reduce and/or minimize the time taken to perform multiple PDN context transfers during IRAT scenarios. As will be described in more detail below, single-shot signaling may be used to bundle multiple PDN context transfer requests. A network may receive the single-shot signaling message and may transfer multiple PDN contexts. The single-shot signaling message may indicate a number of the PDN contexts to be transferred as part of the transition.

Figure 7:
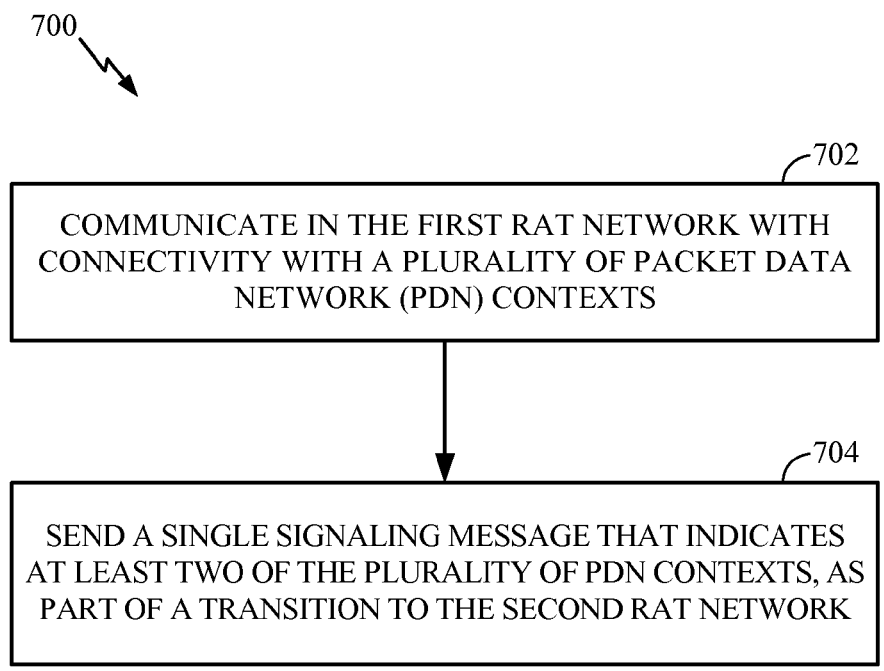
FIG. 7 illustrates operations performed, for example, by a mobile device when transitioning from a first RAT to a second RAT, in accordance with aspects of the present disclosure.

FIG. 7 illustrates example operations 700, which may be performed by a mobile device capable of communicating in at least first and second RAT networks, according to aspects of the present disclosure. The operations 700 may be performed, for example, by a multi-mode mobile device, such as UE 402 of FIG. 4.

At 702, the mobile device may communicate in the first RAT network with connectivity with a plurality of packet data network (PDN) contexts. As part of a transition to the second RAT network, at 704, the mobile device may send a single signaling message that indicates at least two of the plurality of PDN contexts.

Figure 8:
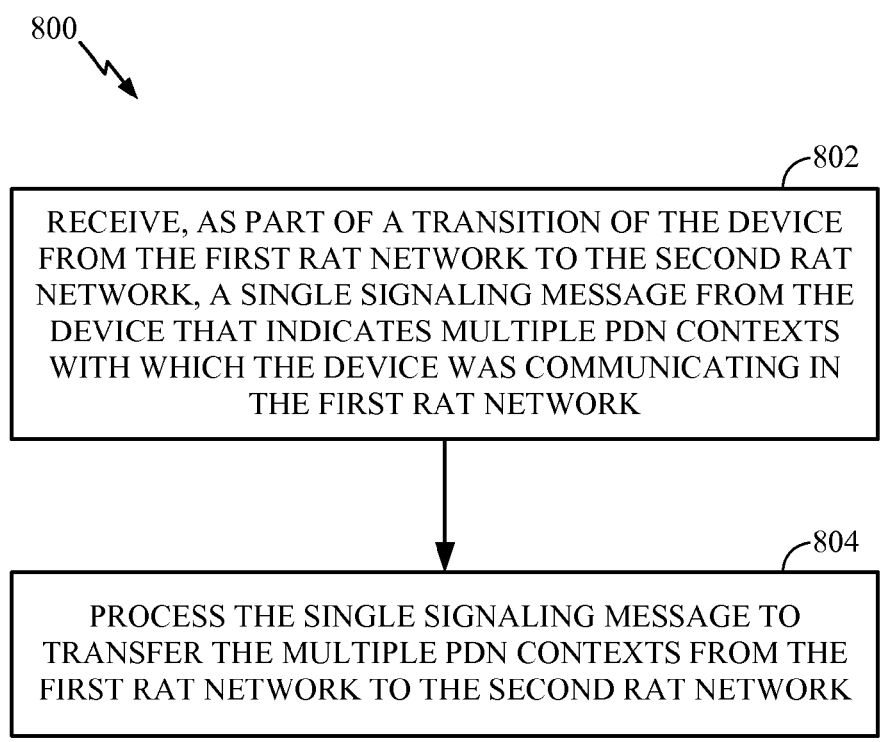
FIG. 8 illustrates operations performed, for example, by a network when a mobile device transitions from a first RAT to a second RAT, in accordance with aspects of the present disclosure.

FIG. 8 illustrates example operations 800, which may be performed by a RAT network, according to aspects of the present disclosure. The operations 800 may be performed, for example, by HSGW 410 or MME 408 of FIG. 4.

At 802, the network may receive, as part of a transition of the device from the first RAT network to the second RAT network, a single signaling message from the device that indicates multiple PDN contexts with which the device was communicating in the first RAT network. At 804, the network may process the single signaling message to transfer the multiple PDN contexts from the first RAT network to the second RAT network.

Figure 9:
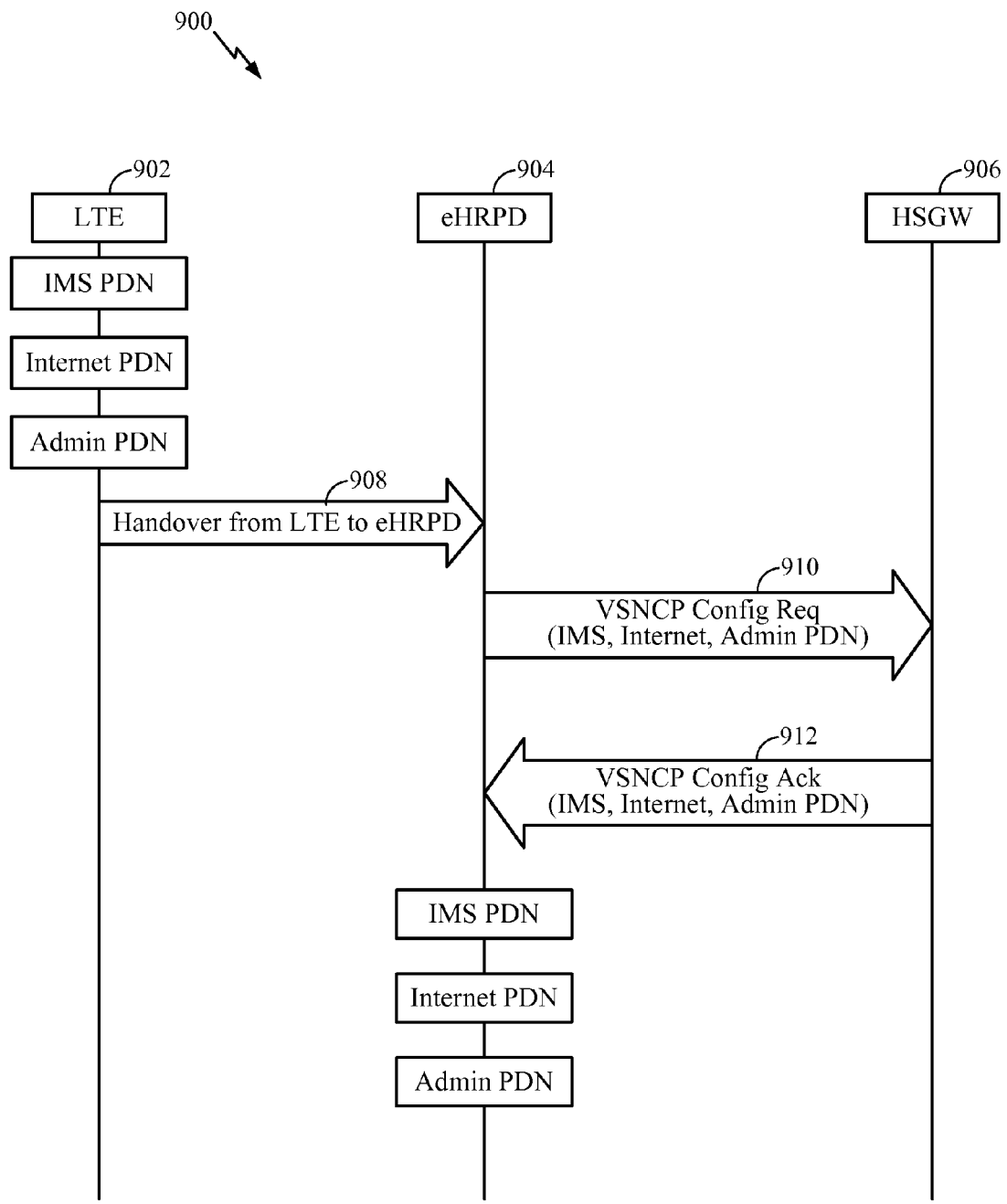
FIG. 9 illustrates an example of IRAT improvement when a mobile device performs a handover from an LTE network to an eHRPD network, in accordance according with aspects of the present disclosure.

FIG. 9 illustrates an example 900 of IRAT improvement when a mobile device performs a handover from an LTE network 902 to an eHRPD network 904, according to aspects of the present disclosure. The mobile device may communicate with multiple PDN contexts in the LTE network 902, including an IMS PDN, Internet PDN, and/or Administrative PDN.

At 908, the mobile device may handover from the LTE network 902 to the eHRPD network 904. To facilitate IRAT improvement (e.g., optimization), the mobile device may transmit a single Vendor-Specific Network Control Protocol (VSNCP) Configuration Request Message 910, wherein the message may indicate two or more PDN contexts that may be transferred to the eHRPD network 904. Accordingly, the mobile device may transmit a single signaling message which includes a handover attach request message with a plurality of PDN connectivity requests. As illustrated in FIG. 9, the mobile device may transmit a single VSNCP singling message that indicates transfer of the IMS, Internet, and Administrative PDN contexts to the eHRPD network.

The HSGW 906 may receive the single signaling message that includes a handover attach request message with a plurality of PDN connectivity requests. According to aspects, the single signaling message may include a parameter which indicates a number the number of PDN contexts to be transferred from the LTE network 902 to the eHRPD network 904.

At 912, the HSGW 906 may transmit a VSNCP Configuration Acknowledgment for transferring multiple PDN contexts. According to aspects, at least two of the PDNs may be activated together. As illustrated in FIG. 9, the IMS PDN, Internet PDN, and Administrative PDN may be activated together (e.g., in parallel).

Figure 10:
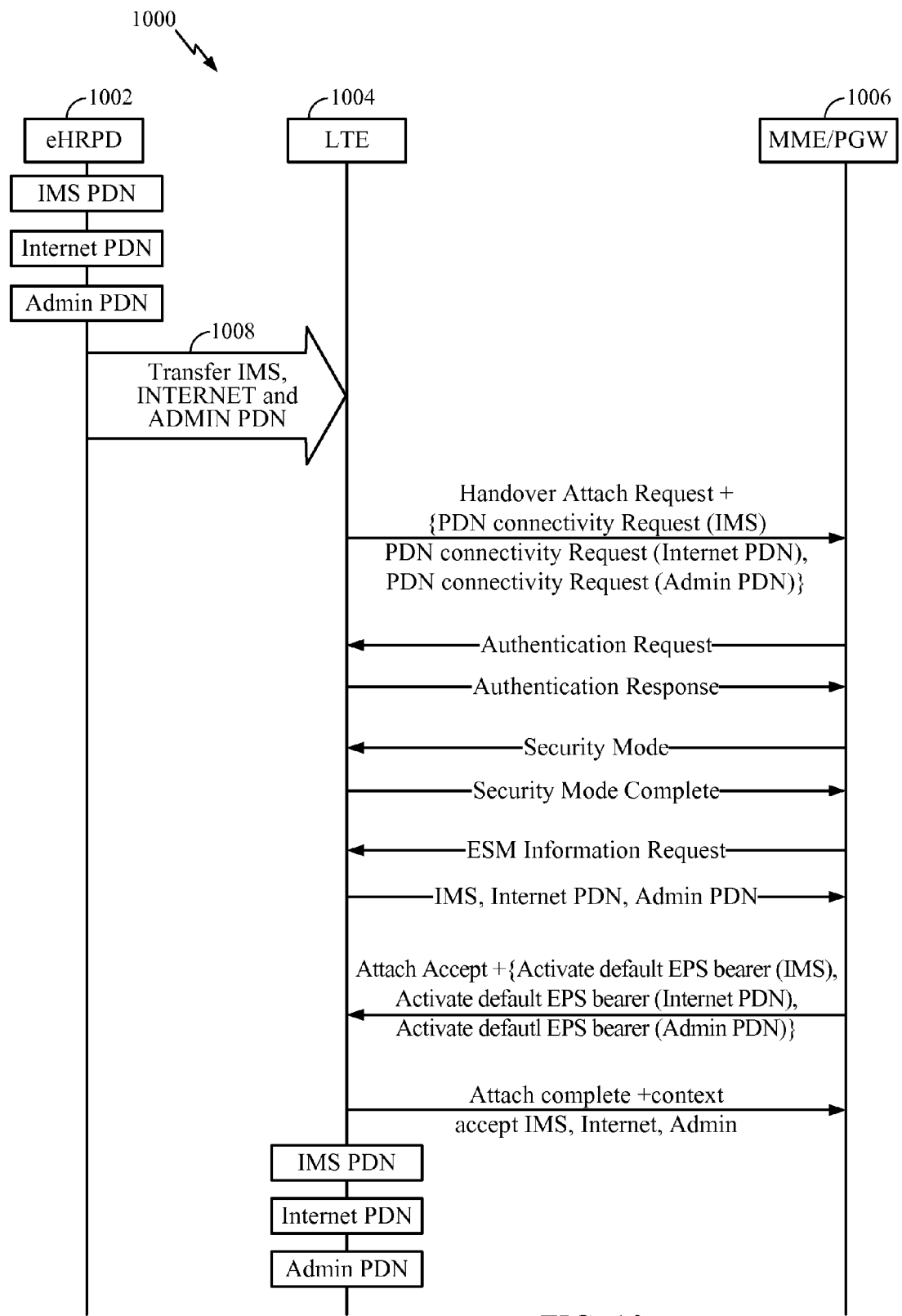
FIG. 10 illustrates an example of IRAT improvement when a mobile device performs a handover from an eHRPD network to an LTE network, in accordance with aspects of the present disclosure

FIG. 10 illustrates an example 1000 of IRAT improvement when a mobile device performs a handover from an eHRPD network 1002 to an LTE network 1004, according to aspects of the present disclosure. The mobile device may communicate with multiple PDN contexts in the eHRPD network 1002, including, for example, an IMS PDN, Internet PDN, and Administrative PDN.

At 1008, the mobile device may handover from the eHRPD network 1002 to the LTE network 1004. To facilitate IRAT improvement, the mobile device may transfer the IMS, Internet, and Administrative PDN contexts to the LTE network 1004. According to aspects, the mobile device may transmit a single NAS signaling message to the MME/PGW 1006.

The single signaling message may include a Handover Attach Request, a parameter indicating the number of PDN contexts attempting to be transferred to the LTE network 1004, and/or parameters specific to the transfer for each PDN context. The MME/PGW 1006 may receive the single signaling message and may activate multiple PDNs together. For example, the IMS PDN, Internet PDN, and Administrative PDN may be activated in parallel.

Figure 11:
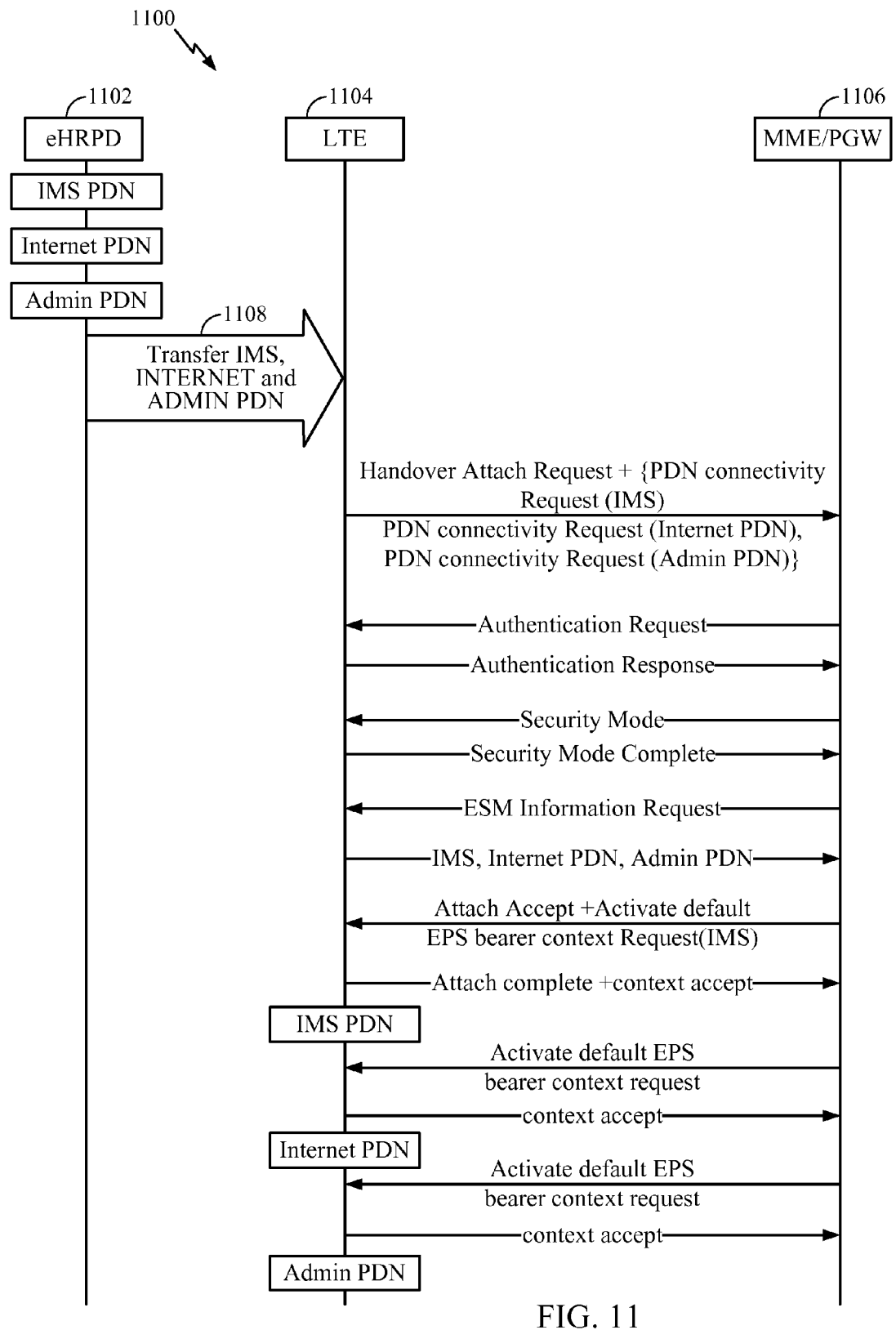
FIG. 11 illustrates an example of IRAT improvement when a mobile device moves from an eHRPD network to an LTE network, in accordance with aspects of the present discourse.

FIG. 11 illustrates an example 1100 of IRAT improvement when a mobile device moves from an eHRPD network 1102 to an LTE network 1104, according to aspects of the present disclosure. The mobile device may be communicating with multiple PDN contexts in the eHRPD network 1102, including, for example, an IMS PDN, Internet PDN, and Administrative PDN. At 1108, the mobile device may handover from the eHRPD network 1102 to the LTE network 1104.

The MME/PGW 1106 may receive a single Handover Attach Request message from the mobile device. As described above with reference to FIG. 10, the Handover Attach Request message may include connectivity requests for more than one PDN context transfer.

According to aspects, the MME/PGW 1106 may receive the single signaling message and activate each PDN individually. Activating each PDN context individually may provide the network with flexibility, for example, in situations when the network may be unable to activate two or more transferred PDN contexts at the same time (e.g., in parallel). In these cases, after receiving the single Handover Attach Request message, MME/PGW 1106 may activate transferred PDN contexts separately. As illustrated, the IMS PDN context may be transferred first, followed by the Internet PDN context and Administrative PDN context.

Figure 12:
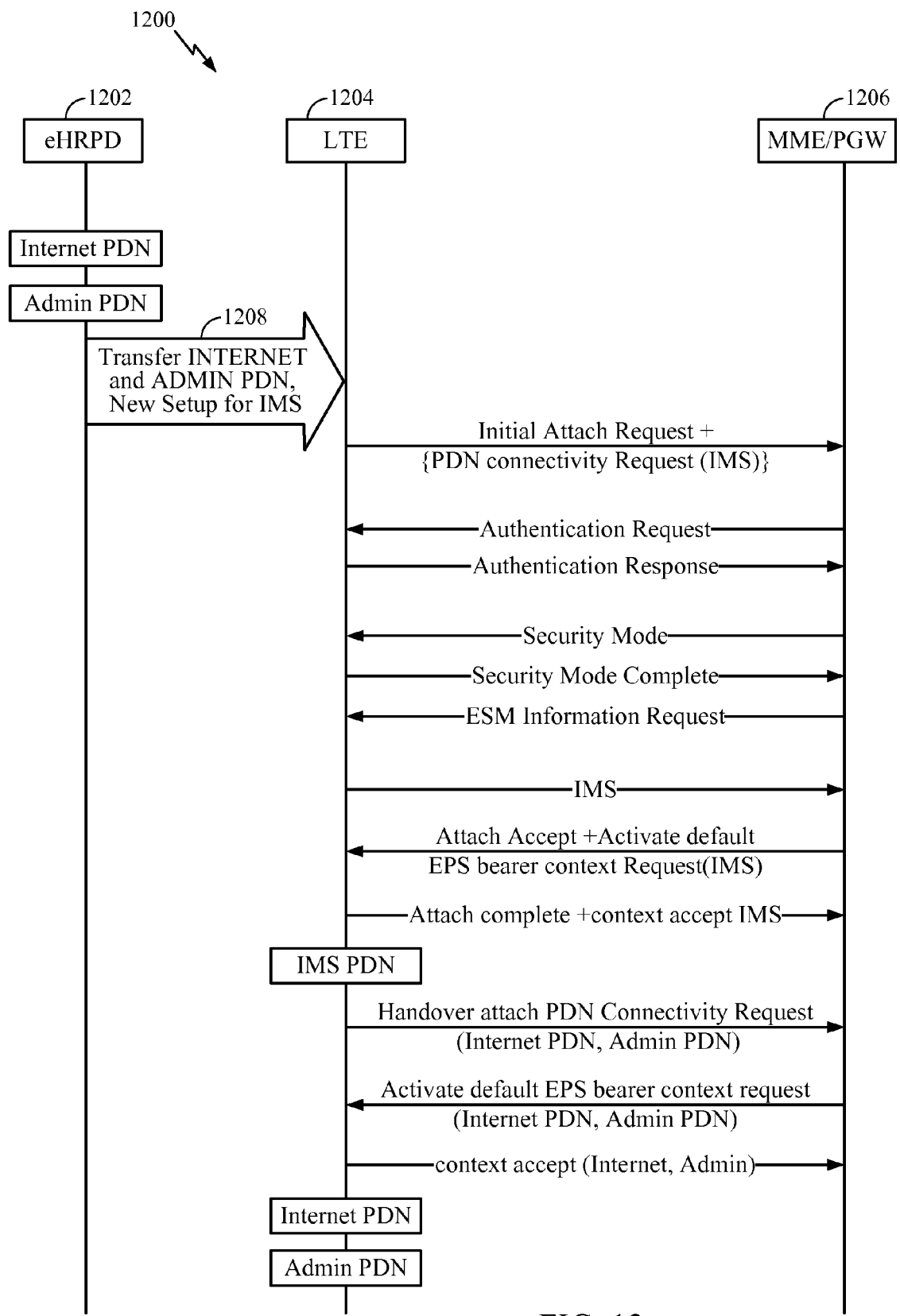
FIG. 12 illustrates an example of IRAT improvement when a mobile device moves from an eHRPD network to an LTE network, in accordance with certain aspects of the present disclosure.

FIG. 12 illustrates an example 1200 of IRAT improvement when a mobile device moves from an eHRPD network 1202 to an LTE network 1204, according to aspects of the present disclosure. The mobile device may be communicating in the eHRPD network 1202 with connectivity with an Internet PDN and Administrative PDN. At 1208, the mobile device may handover from the eHRPD network 1202 to the LTE network 1204. As part of the handover, the mobile device may transmit a single signaling message that indicates at least two PDN contexts to be transferred. According to aspects, the single signaling message may further indicate that a new PDN context is to be activated as part of the transition.

For example, the mobile device may attempt to transfer the active Internet PDN and Administrative PDN contexts and may set up a new IMS PDN context. Each of the plurality of PDN contexts and the new PDN context (e.g., IMS PDN) may be activated together. According to aspects, at least two of the PDN contexts, including the new PDN context to be established and the plurality of PDN contexts already established, may be activated together.

As illustrated in FIG. 12, the mobile device may transmit an Initial Attach Request Message to the MME/PGW 1206. According to aspects, the Initial Attach Request Message may include a connectivity request for a PDN context that the mobile device had not established in the eHRPD network 1202. For example, the Initial Attach Request Message may include a PDN connectivity request for setting up a new IMS PDN context. The signaling messages shown for setting up the new IMS PDN context in the LTE network 1204 are illustrative of an example set of signaling messages. According to aspects, fewer signaling messages may be exchanged while setting up a context in the LTE network 1204.

According to aspects, after the IMS PDN context is established, the mobile device may transmit a single signaling message containing a handover attach request message with a plurality of PDN connectivity requests. The single signaling message may include a count parameter indicating the number of PDN contexts attempting to be transferred to the LTE network 1204. The handover attach message may include PDN connectivity requests for the Internet PDN and Administrative PDN. The MME 1206 may activate the Internet PDN and Administrative PDN contexts in parallel.

As described herein, a mobile device may be communicating in a first RAT network with established connectivity with a plurality of PDN contexts. As part of a transition to a second RAT network, the mobile device may send a single signaling message that indicates at least two of the PDN contexts to be transferred. In some aspects, a signaling message may be employed to indicate an IMS PDN context to be transferred. Thereafter, a single signaling message may be employed to indicate at least two other PDN contexts (e.g., Internet PDN, Administrative PDN) to be transferred.

According to aspects, at least one of the first and second RAT networks may be an LTE network and at least one of the first and second RAT networks may be an eHRPD network. Aspects of the present disclosure may be extended between LTE and UMTS Packet Data Protocol (PDP) context transfers. For example, according to aspects, at least one of the first and second RATs may include at one of an eHRPD network or a UMTS network.

In certain aspects, the single signaling message may comprise a handover attach request message with a plurality of PDN connectivity requests. As described above, each PDN may be activated individually. Alternatively, at least two of the PDNs may be activated together, which may facilitate IRAT improvement.

Various techniques are described herein with reference to an LTE and eHRPD network as a specific, but not limiting, example of a network in which the techniques may be used. However, those skilled in the art will appreciate that the techniques may be applied more generally in various types of wireless networks.

Although several scenarios refer to transferring an IMS, Internet, and Administrative (e.g., Provisioning) PDN context from a first RAT to a second RAT, those skilled in the art will appreciate that the techniques described herein may be applied to transferring any type of PDN context. PDN contexts may include, for example, carrier-specific PDNs, operator-specific, and/or GPS PDN, as well as any other PDN context. For example, the plurality of PDN contexts to be transferred may include at least two of an IP Multimedia Subsystem (IMS), provisioning, operator-specific, carrier-specific, or GPS PDN contexts. Such services may be orthogonal to each other.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication by a device capable of communicating in at least first and second radio access technology (RAT) networks, comprising:
   communicating in the first RAT network with connectivity with a plurality of packet data network (PDN) contexts; and
   as part of a transition to the second RAT network, sending a single signaling message that indicates at least two of the plurality of PDN contexts and indicates that a new PDN context is to be activated as part of the transition, wherein at least two PDN contexts, of the combination of the new PDN context and the plurality of PDN contexts, are activated together.

2. The method of claim 1, wherein at least one of the first and second RAT networks comprises a Long Term Evolution (LTE) network.

3. The method of claim 2, wherein the single signaling message comprises a handover attach request message with a plurality of PDN connectivity requests.

4. The method of claim 3, wherein each PDN is activated individually.

5. The method of claim 3, wherein at least two of the PDNs are activated together.

6. The method of claim 1, wherein at least one of the first and second RAT networks comprises at least one of an enhanced High Rate Packet Data (eHRPD) network or a UMTS network.

7. The method of claim 6, wherein the single signaling message comprises a Vendor-Specific Network Control Protocol (VSNCP) configuration request message indicating a plurality of PDN contexts.

8. The method of claim 7, wherein each PDN is activated individually.

9. The method of claim 7, wherein at least two of the PDNs are activated together.

10. The method of claim 1, wherein the single signaling message further indicates a number of PDN contexts to be transferred as part of the transition.

11. The method of claim 1, wherein the plurality of PDN contexts includes at least two of an IP Multimedia Subsystem (IMS), provisioning, operator-specific, or GPS PDN context.

12. A method for wireless communication by a device capable of communicating in at least first and second radio access technology (RAT) networks, comprising:
    communicating in the first RAT network with connectivity with a plurality of packet data network (PDN) contexts; and
    as part of a transition to the second RAT network, sending a single signaling message that indicates at least two of the plurality of PDN contexts and indicates that a new PDN context is to be activated as part of the transition, wherein each of the plurality of PDN contexts and the new PDN context is activated individually.

13. A method for wireless communication with a device capable of communicating in at least a first and second radio access technology (RAT) networks, comprising:
    receiving, as part of a transition of the device from the first RAT network to the second RAT network, a single signaling message from the device that indicates multiple PDN contexts with which the device was communicating in the first RAT network and indicates that a new PDN context is to be activated as part of the transition; and
    processing the single signaling message to transfer the multiple PDN contexts from the first RAT network to the second RAT network, wherein at least two PDN contexts, of the combination of the new PDN context and the multiple PDN contexts, are activated together.

14. The method of claim 13, wherein at least one of the first and second RAT networks comprises a Long Term Evolution (LTE) network.

15. The method of claim 14, wherein the single signaling message comprises a handover attach request message with a plurality of PDN connectivity requests.

16. The method of claim 15, wherein each PDN is activated individually.

17. The method of claim 15, wherein at least two of the PDNs are activated together.

18. The method of claim 13, wherein the single signaling message further indicates a number of PDN contexts to be transferred as part of the transition.

19. The method of claim 13, wherein the plurality of PDN contexts includes at least two of an IP Multimedia Subsystem (IMS), provisioning, operator-specific, or GPS PDN context.

20. The method of claim 13, wherein at least one of the first and second RAT networks comprises at least one of an enhanced High Rate Packet Data (eHRPD) network or a UMTS network.

21. The method of claim 20, wherein the single signaling message comprises a Vendor-Specific Network Control Protocol (VSNCP) configuration request message indicating a plurality of PDN contexts.

22. The method of claim 21, wherein each PDN is activated individually.

23. The method of claim 21, wherein at least two of the PDNs are activated together.

24. A method for wireless communication with a device capable of communicating in at least a first and second radio access technology (RAT) networks, comprising:
    receiving, as part of a transition of the device from the first RAT network to the second RAT network, a single signaling message from the device that indicates multiple PDN contexts with which the device was communicating in the first RAT network and indicates that a new PDN context is to be activated as part of the transition; and
    processing the single signaling message to transfer the multiple PDN contexts from the first RAT network to the second RAT network, wherein each of the multiple PDN contexts and the new PDN context is activated individually.

25. An apparatus for wireless communication by a device capable of communicating in at least first and second radio access technology (RAT) networks, comprising:
    means for communicating in the first RAT network with connectivity with a plurality of packet data network (PDN) contexts; and
    as part of a transition to the second RAT network, means for sending a single signaling message that indicates at least two of the plurality of PDN contexts and indicates that a new PDN context is to be activated as part of the transition, wherein at least two PDN contexts, of the combination of the new PDN context and the plurality of PDN contexts, are activated together.

26. The apparatus of claim 25, wherein at least one of the first and second RAT networks comprises a Long Term Evolution (LTE) network.

27. The apparatus of claim 26, wherein the single signaling message comprises a handover attach request message with a plurality of PDN connectivity requests.

28. The apparatus of claim 27, wherein each PDN is activated individually.

29. The apparatus of claim 27, wherein at least two of the PDNs are activated together.

30. The apparatus of claim 25, wherein at least one of the first and second RAT networks comprises at least one of an enhanced High Rate Packet Data (eHRPD) network or a UMTS network.

31. The apparatus of claim 30, wherein the single signaling message comprises a Vendor-Specific Network Control Protocol (VSNCP) configuration request message indicating a plurality of PDN contexts.

32. The apparatus of claim 31, wherein each PDN is activated individually.

33. The apparatus of claim 31, wherein at least two of the PDNs are activated together.

34. The apparatus of claim 25, wherein the single signaling message further indicates a number of PDN contexts to be transferred as part of the transition.

35. The apparatus of claim 25, wherein the plurality of PDN contexts includes at least two of an IP Multimedia Subsystem (IMS), provisioning, operator-specific, or GPS PDN context.

36. An apparatus for wireless communication by a device capable of communicating in at least first and second radio access technology (RAT) networks, comprising:
    means for communicating in the first RAT network with connectivity with a plurality of packet data network (PDN) contexts; and as part of a transition to the second RAT network, means for sending a single signaling message that indicates at least two of the plurality of PDN contexts and indicates that a new PDN context is to be activated as part of the transition, wherein each of the plurality of PDN contexts and the new PDN context is activated individually.

37. An apparatus for wireless communication with a device capable of communicating in at least a first and second radio access technology (RAT) networks, comprising:
means for receiving, as part of a transition of the device from the first RAT network to the second RAT network, a single signaling message from the device that indicates multiple PDN contexts with which the device was communicating in the first RAT network and indicates that a new PDN context is to be activated as part of the transition; and
means for processing the single signaling message to transfer the multiple PDN contexts from the first RAT network to the second RAT network, wherein at least two PDN contexts, of the combination of the new PDN context and the multiple PDN contexts, are activated together.

38. The apparatus of claim 37, wherein at least one of the first and second RAT networks comprises a Long Term Evolution (LTE) network.

39. The apparatus of claim 38, wherein the single signaling message comprises a handover attach request message with a plurality of PDN connectivity requests.

40. The apparatus of claim 39, wherein each PDN is activated individually.

41. The apparatus of claim 39, wherein at least two of the PDNs are activated together.

42. The apparatus of claim 37, wherein the single signaling message further indicates a number of PDN contexts to be transferred as part of the transition.

43. The apparatus of claim 37, wherein the plurality of PDN contexts includes at least two of an IP Multimedia Subsystem (IMS), provisioning, operator-specific, or GPS PDN context.

44. The apparatus of claim 37, wherein at least one of the first and second RAT networks comprises at least one of an enhanced High Rate Packet Data (eHRPD) network or a UMTS network.

45. The apparatus of claim 44, wherein the single signaling message comprises a Vendor-Specific Network Control Protocol (VSNCP) configuration request message indicating a plurality of PDN contexts.

46. The apparatus of claim 45, wherein each PDN is activated individually.

47. The apparatus of claim 45, wherein at least two of the PDNs are activated together.

48. An apparatus for wireless communication with a device capable of communicating in at least a first and second radio access technology (RAT) networks, comprising:
means for receiving, as part of a transition of the device from the first RAT network to the second RAT network, a single signaling message from the device that indicates multiple PDN contexts with which the device was communicating in the first RAT network and indicates that a new PDN context is to be activated as part of the transition; and
means for processing the single signaling message to transfer the multiple PDN contexts from the first RAT network to the second RAT network, wherein each of the multiple PDN contexts and the new PDN context is activated individually.

49. An apparatus for wireless communication by a device capable of communicating in at least first and second radio access technology (RAT) networks, comprising:
at least one processor configured to:
communicate in the first RAT network with connectivity with a plurality of packet data network (PDN) contexts; and
as part of a transition to the second RAT network, send a single signaling message that indicates at least two of the plurality of PDN contexts and indicates that a new PDN context is to be activated as part of the transition, wherein at least two PDN contexts, of the combination of the new PDN context and the plurality of PDN contexts, are activated together; and
a memory coupled to the at least one processor.

50. The apparatus of claim 49, wherein at least one of the first and second RAT networks comprise a Long Term Evolution (LTE) network.

51. The apparatus of claim 50, wherein the single signaling message comprises a handover attach request message with a plurality of PDN connectivity requests.

52. The apparatus of claim 51, wherein each PDN is activated individually.

53. The apparatus of claim 51, wherein at least two of the PDNs are activated together.

54. The apparatus of claim 49, wherein at least one of the first and second RAT networks comprises at least one of an enhanced High Rate Packet Data (eHRPD) network or a UMTS network.

55. The apparatus of claim 54, wherein the single signaling message comprises a Vendor-Specific Network Control Protocol (VSNCP) configuration request message indicating a plurality of PDN contexts.

56. The apparatus of claim 55, wherein each PDN is activated individually.

57. The apparatus of claim 55, wherein at least two of the PDNs are activated together.

58. The apparatus of claim 49, wherein the single signaling message further indicates a number of PDN contexts to be transferred as part of the transition.

59. The apparatus of claim 49, wherein the plurality of PDN contexts includes at least two of an IP Multimedia Subsystem (IMS), provisioning, operator-specific, or GPS PDN context.

60. An apparatus for wireless communication by a device capable of communicating in at least first and second radio access technology (RAT) networks, comprising:
at least one processor configured to:
communicate in the first RAT network with connectivity with a plurality of packet data network (PDN) contexts; and
as part of a transition to the second RAT network, send a single signaling message that indicates at least two of the plurality of PDN contexts and indicates that a new PDN context is to be activated as part of the transition, wherein each of the plurality of PDN contexts and the new PDN context is activated individually.

61. An apparatus for wireless communication with a device capable of communicating in at least a first and second radio access technology (RAT) networks, comprising:
at least one processor configured to:
receive, as part of a transition of the device from the first RAT network to the second RAT network, a single signaling message from the device that indicates multiple PDN contexts with which the device was communicating in the first RAT network and indicates that a new PDN context is to be activated as part of the transition; and process the single signaling message to transfer the multiple PDN contexts from the first RAT network to the second RAT network, wherein at least two PDN contexts, of the combination of the new PDN context and the multiple PDN contexts, are activated together; and a memory coupled to the at least one processor.

62. The apparatus of claim 61, wherein at least one of the first and second RAT networks comprise a Long Term Evolution (LTE) network.

63. The apparatus of claim 62, wherein the single signaling message comprises a handover attach request message with a plurality of PDN connectivity requests.

64. The apparatus of claim 63, wherein each PDN is activated individually.

65. The apparatus of claim 63, wherein at least two of the PDNs are activated together.

66. The apparatus of claim 61, wherein the single signaling message further indicates a number of PDN contexts to be transferred as part of the transition.

67. The apparatus of claim 61, wherein the plurality of PDN contexts includes at least two of an IP Multimedia Subsystem (IMS), provisioning, operator-specific, or GPS PDN context.

68. The apparatus of claim 61, wherein at least one of the first and second RAT networks comprise at least one of an enhanced High Rate Packet Data (eHRPD) network or a UMTS network.

69. The apparatus of claim 68, wherein the single signaling message comprises a Vendor-Specific Network Control Protocol (VSNCP) configuration request message indicating a plurality of PDN contexts.

70. The apparatus of claim 69, wherein each PDN is activated individually.

71. The apparatus of claim 69, wherein at least two of the PDNs are activated together.

72. An apparatus for wireless communication with a device capable of communicating in at least a first and second radio access technology (RAT) networks, comprising:

at least one processor configured to:
receive, as part of a transition of the device from the first RAT network to the second RAT network, a single signaling message from the device that indicates multiple PDN contexts with which the device was communicating in the first RAT network and indicates that a new PDN context is to be activated as part of the transition; and process the single signaling message to transfer the multiple PDN contexts from the first RAT network to the second RAT network, wherein each of the multiple PDN contexts and the new PDN context is activated individually.

73. A computer-program product for wireless communications by a device capable of communicating in at least first and second radio access technology (RAT) networks, the computer-program product comprising a non-transitory computer-readable medium having code stored thereon, the code executable by one or more processors for:

communicating in a first radio access technology (RAT) network with connectivity with a plurality of packet data network (PDN) contexts; and as part of a transition to the second RAT network, sending a single signaling message that indicates at least two of the plurality of PDN contexts and indicates that a new PDN context is to be activated as part of the transition, wherein at least two PDN contexts, of the combination of the new PDN context and the plurality of PDN contexts, are activated together.

74. The computer-program product of claim 73, wherein at least one of the first and second RAT networks comprise a Long Term Evolution (LTE) network.

75. The computer-program product of claim 74, wherein the single signaling message comprises a handover attach request message with a plurality of PDN connectivity requests.

76. The computer-program product of claim 75, wherein each PDN is activated individually.

77. The computer-program product of claim 75, wherein at least two of the PDNs are activated together.

78. The computer-program product of claim 73, wherein at least one of the first and second RAT networks comprises at least one of an enhanced High Rate Packet Data (eHRPD) network or a UMTS network.

79. The computer-program product of claim 78, wherein the single signaling message comprises a Vendor-Specific Network Control Protocol (VSNCP) configuration request message indicating a plurality of PDN contexts.

80. The computer-program product of claim 79, wherein each PDN is activated individually.

81. The computer-program product of claim 79, wherein at least two of the PDNs are activated together.

82. The computer-program product of claim 73, wherein the single signaling message further indicates a number of PDN contexts to be transferred as part of the transition.

83. The computer-program product of claim 73, wherein the plurality of PDN contexts includes at least two of an IP Multimedia Subsystem (IMS), provisioning, operator-specific, or GPS PDN context.

84. A computer-program product for wireless communications by a device capable of communicating in at least first and second radio access technology (RAT) networks, the computer-program product comprising a non-transitory computer-readable medium having code stored thereon, the code executable by one or more processors for:

communicating in the first RAT network with connectivity with a plurality of packet data network (PDN) contexts; and as part of a transition to the second RAT network, sending a single signaling message that indicates at least two of the plurality of PDN contexts and indicates that a new PDN context is to be activated as part of the transition, wherein each of the plurality of PDN contexts and the new PDN context is activated individually.

85. A computer-program product for wireless communications with a device capable of communicating in at least first and second radio access technology (RAT) networks, the computer-program product comprising a non-transitory computer-readable medium having code stored thereon, the code executable by one or more processors for:

receiving, as part of a transition of the device from the first RAT network to the second RAT network, a single signaling message from a device that indicates multiple PDN contexts with which the device was communicating in the first RAT network and indicates that a new PDN context is to be activated as part of the transition; and processing the single signaling message to transfer the multiple PDN contexts from the first RAT network to the second RAT network, wherein at least two PDN contexts, of the combination of the new PDN context and the multiple PDN contexts, are activated together.

86. The computer-program product of claim 85, wherein at least one of the first and second RAT networks comprises a Long Term Evolution (LTE) network.

87. The computer-program product of claim 86, wherein the single signaling message comprises a handover attach request message with a plurality of PDN connectivity requests.

88. The computer-program product of claim 87, wherein each PDN is activated individually.

89. The computer-program product of claim 87, wherein at least two of the PDNs are activated together.

90. The computer-program product of claim 85, wherein the single signaling message further indicates a number of PDN contexts to be transferred as part of the transition.

91. The computer-program product of claim 85, wherein the plurality of PDN contexts includes at least two of an IP Multimedia Subsystem (IMS), provisioning, operator -specific, or GPS PDN context.

92. The computer-program product of claim 85, wherein at least one of the first and second RAT networks comprises at least one of an enhanced High Rate Packet Data (eHRPD) network or a UMTS network.

93. The computer-program product of claim 92, wherein the single signaling message comprises a Vendor-Specific Network Control Protocol (VSNCP) configuration request message indicating a plurality of PDN contexts.

94. The computer-program product of claim 93, wherein each PDN is activated individually.

95. The computer-program product of claim 93, wherein at least two of the PDNs are activated together.

96. A computer-program product for wireless communications with a device capable of communicating in at least first and second radio access technology (RAT) networks, the computer-program product comprising a non-transitory computer-readable medium having code stored thereon, the code executable by one or more processors for:

receiving, as part of a transition of the device from the first RAT network to the second RAT network, a single signaling message from a device that indicates multiple PDN contexts with which the device was communicating in the first RAT network and indicates that a new PDN context is to be activated as part of the transition; and processing the single signaling message to transfer the multiple PDN contexts from the first RAT network to the second RAT network, wherein each of the multiple PDN contexts and the new PDN context is activated individually.

\* \* \* \* \*